US010650825B2

(12) United States Patent
Katoh (10) Patent No.: US 10,650,825 B2
(45) Date of Patent: May 12, 2020

(54) COMMUNICATION DEVICE

(71) Applicant: SHARP KABUSHIKI KAISHA, Sakai, Osaka (JP)

(72) Inventor: Kazunori Katoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 78 days.

(21) Appl. No.: 15/766,791

(22) PCT Filed: Dec. 20, 2016

(86) PCT No.: PCT/IB2016/057805
§ 371 (c)(1),
(2) Date: Apr. 6, 2018

(87) PCT Pub. No.: WO2017/068560
PCT Pub. Date: Apr. 27, 2017

(65) Prior Publication Data
US 2018/0286407 A1    Oct. 4, 2018

(30) Foreign Application Priority Data

Oct. 23, 2015 (JP) .................................. 2015-208939

(51) Int. Cl.
*G10L 17/00* (2013.01)
*G10L 15/22* (2006.01)
(Continued)

(52) U.S. Cl.
CPC ............ *G10L 17/005* (2013.01); *G06F 21/32* (2013.01); *G10L 15/065* (2013.01);
(Continued)

(58) Field of Classification Search
CPC ...... G10L 15/065; G10L 15/083; G10L 15/10; G10L 15/22; G10L 15/265; G10L 17/00
(Continued)

(56) References Cited

U.S. PATENT DOCUMENTS 9,946,857 B2 *  4/2018  Beals ................... H04L 12/2825
2003/0103088 A1 *  6/2003  Dresti ................... G06F 3/0481
                                                                715/835
(Continued)

FOREIGN PATENT DOCUMENTS

JP      2006-017936 A     1/2006
JP      2009-145755 A     7/2009
(Continued)

*Primary Examiner* — Paras D Shah
(74) *Attorney, Agent, or Firm* — ScienBiziP, P.C.

(57) ABSTRACT

Provided is a technology which improves reliability of the interaction between devices in a system where the devices communicate. In an information appliance system, multiple information appliances and a communication device such as a smart phone are in M2M communication. The communication device receives input of a voice from a user, and authenticates the user based on a voice signal, and sample voice data accumulated for user identification. The communication device performs a speech recognition process on the voice signal to determine an instruction of the user. When the user is authenticated and the instruction of the user is determined, the communication device transmits a command according to the instruction to an information appliance that is associated with the determined instruction of the user.

5 Claims, 4 Drawing Sheets (51) Int. Cl.
 *G06F 21/32* (2013.01)
 *G10L 15/10* (2006.01)
 *G10L 15/065* (2013.01)
 *G10L 15/08* (2006.01)
(52) U.S. Cl.
 CPC ............ *G10L 15/083* (2013.01); *G10L 15/10* (2013.01); *G10L 15/22* (2013.01); *G10L 17/00* (2013.01); *G10L 2015/223* (2013.01)
(58) Field of Classification Search
 USPC ........................................................ 704/275
 See application file for complete search history.

(56) References Cited

U.S. PATENT DOCUMENTS

| | | | | |
|---|---|---|---|---|
| 2009/0168741 A1* | 7/2009 | Masuda | .............. | H04M 1/7253 370/343 |
| 2011/0068902 A1* | 3/2011 | Lim | .............. | G08C 17/02 340/10.1 |
| 2012/0115503 A1* | 5/2012 | Lynch | .............. | H04L 67/16 455/456.1 |
| 2013/0183944 A1* | 7/2013 | Mozer | .............. | H04L 12/282 455/414.1 |
| 2013/0225128 A1* | 8/2013 | Gomar | .............. | H04W 12/06 455/411 |
| 2013/0325484 A1* | 12/2013 | Chakladar | .............. | G06F 3/167 704/275 |
| 2014/0108019 A1* | 4/2014 | Ehsani | .............. | G10L 21/06 704/275 |
| 2014/0156281 A1* | 6/2014 | Boyd | .............. | H04L 12/281 704/275 |
| 2014/0330560 A1* | 11/2014 | Venkatesha | .............. | G06F 21/32 704/235 |
| 2015/0162006 A1* | 6/2015 | Kummer | .............. | G07C 9/00571 704/275 |
| 2015/0279356 A1* | 10/2015 | Lee | .............. | G10L 15/24 704/251 |
| 2015/0302857 A1 | 10/2015 | Yamada | | |

FOREIGN PATENT DOCUMENTS

JP     2012-037783 A     2/2012
WO    2015/029379 A1    3/2015

* cited by examiner

COMMUNICATION DEVICE

TECHNICAL FIELD

The present disclosure relates to a system in which multiple devices communicate with each other for operation in interaction therebetween, and a technology for improving reliability of the interaction between the devices. The present application claims priority to Japanese patent application No. 2015-208939 filed on Oct. 23, 2015, the disclosure of which is incorporated by reference herein in its entirety.

BACKGROUND ART

Conventionally, a system where multiple devices communicate is employed in a facility such as a house, for example. For example, a user is able to control information appliances connected over a home network by transmitting commands to these information appliances from a mobile terminal. This improves user convenience. Thus, various techniques are being considered. For example, Japanese Patent Laying-Open No. 2012-37783 (PTD 1) discloses an information appliance system which provides an improved operability, without reducing its convenience. According to the technology disclosed in PTD 1, a result of speech recognition by a speech recognition means is transmitted as recognition result information to an information appliance. With this, in a system comprising information appliances connected to one another over a network, a user is able to control the information appliances via a speech recognition server through voice input to a mobile terminal.

CITATION LIST

Patent Document

PTD 1: Japanese Patent Laying-Open No. 2012-37783
PTD 2: Japanese Patent Laying-Open No. 2006-17936

SUMMARY OF INVENTION

Technical Problem

From the standpoint of security measures, etc., one may want to place limits on a user permitted to control the operations of information appliances. For example, one may want to place limits on permission for control of operations of a television, an air conditioner, and other information appliances installed in a facility to a user who is a resident of the facility, a user who manages the facility, or another user. However, according to the technology disclosed in PTD 1, each information appliance is controlled based on a command indicated by speech recognition, irrespective of Who the user giving the voice command to the information appliance is. When a user transmits the information identifying the user through voice input to the speech recognition server, processing such as concealment of information identifying an individual is required from the standpoint of security.

Thus, for systems where multiple devices communicate, a technology is needed which facilitates control of operations of information appliances while providing security at a fixed level or higher for the control of the information appliances. An object of the present disclosure is to provide a technology for improving reliability of the interactions between devices in a system where these devices communicate with each other.

Solution To Problem

A communication device according to one embodiment is configured communicable with one or more communication apparatuses. The communication device includes: a voice processing unit configured to receive input of a voice and output a voice signal based on the input voice; and a controller configured to control an operation of the communication device. The controller includes: a user identification unit which performs processing to authenticate a user, based on the received voice signal, and voice data accumulated in a storage for user identification; an instruction determination unit which performs a speech recognition process on the received voice signal to determine an instruction of the user indicated by the received voice; and an interacting-apparatus processing unit which, when the user identification unit authenticates the user and the instruction determination unit determines the instruction of the user, transmits a command according to the instruction to a communication apparatus among the one or more communication apparatuses that is associated with the determined instruction of the user.

The communication device according to one embodiment is communicable with a server device. The server device is configured to store voice data for user identification. The communication device is configured communicable with one or more communication apparatuses. The communication device includes: a voice processing unit configured to receive input of a voice, and output a voice signal based on the input voice; and a controller configured to control an operation of the communication device. The controller includes: an interacting-apparatus processing unit which: transmits the voice signal to the server device to cause the server device to perform processing to authenticate a user based on the voice signal and processing to determine an instruction of the user indicated by the voice signal, and receives a processing result from the server device, and when the user is authenticated and the instruction of the user is determined by the server device, transmits a command according to the instruction to a communication apparatus among the one or more communication apparatuses that is associated with the determined instruction of the user.

Advantageous Effects of Invention

According to one embodiment, if the user is authenticated and an instruction of the user is determined by the speech recognition process, the communication device transmits a command to a communication apparatus. Therefore, limits can be placed on a user permitted to control communication apparatuses such as information appliances, and the user can readily control the information appliances by speech recognition, for example. Thus, reliability of the interaction between the devices is improved.

The foregoing and other objects, features, aspects, and advantages of the present invention will become apparent from the following detailed description of the present invention which is to be read in conjunction with the accompanying drawings.

DESCRIPTION OF EMBODIMENTS

Hereinafter, an embodiment according to the present invention is described, with reference to the accompanying drawings. In the following description, the same reference signs refer to the same components. Their names and functionalities are also the same. Thus, detailed description thereof will not be repeated.

<Embodiment>

In the present embodiment, an information appliance system is described which includes a communication device such as a smart phone, and information appliances (communication apparatuses) such as a television and an air conditioner.

Figure 1:
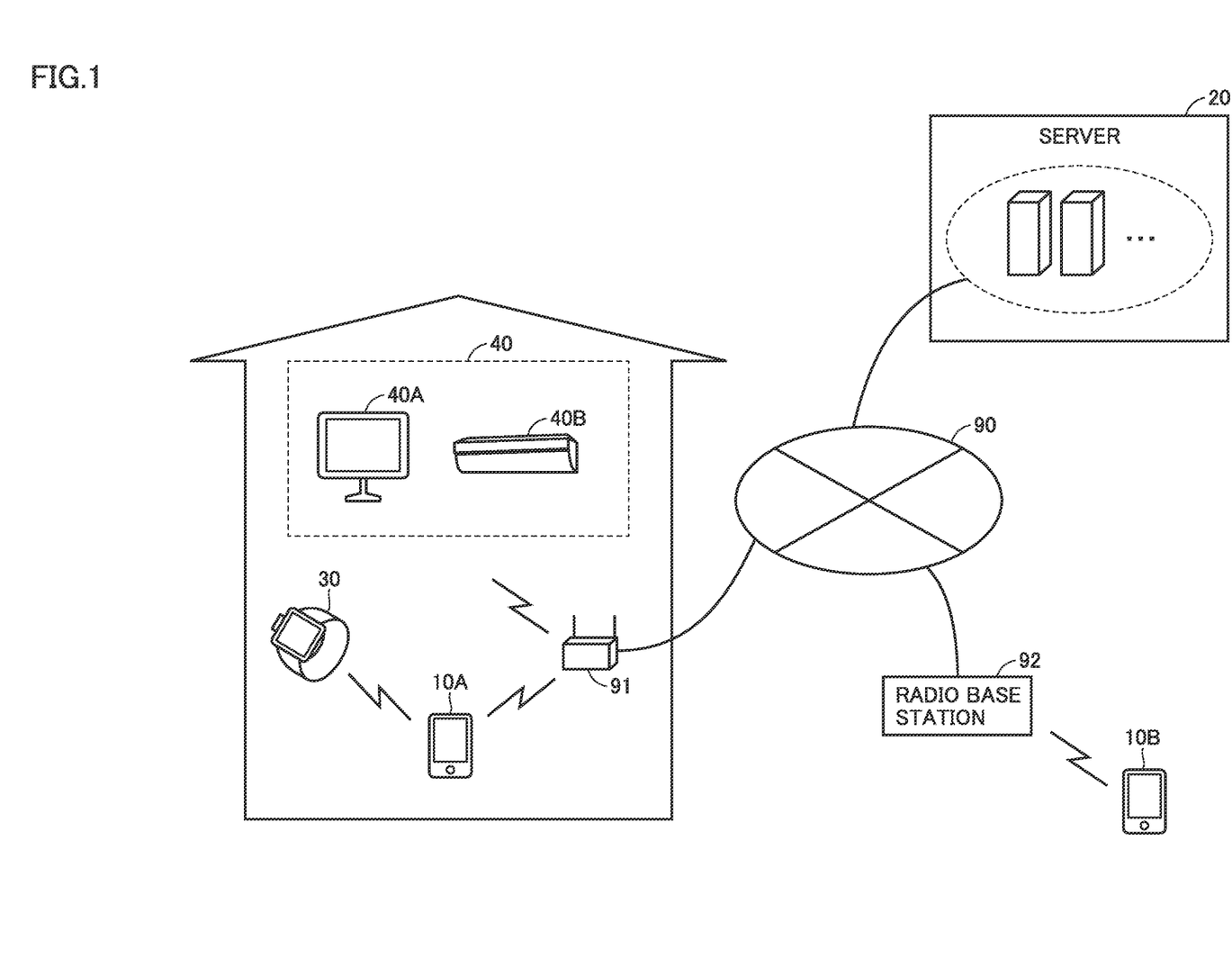
FIG. 1 is a diagram showing an outline of an information appliance system according to the present embodiment.

FIG. 1 is a diagram showing an outline of the information appliance system according to the present embodiment. As shown in FIG. 1, the information appliance system includes a communication device 10A such as a smart phone, and communication apparatuses such as an intimation appliance 40A (television) and an information appliance 40B (air conditioner) (hereinafter, information appliances, including information appliance 40A and information appliance 40B, may be collectively' referred to as "information appliance 40"), Communication device 10A and the communication apparatuses are communicable with each other. For example, communication device 10A communicates with information appliance 40 via a broadband router 91 installed in the facility. A wearable communication device 30 is worn by a user. Wearable communication device 30 communicates with communication device 10A, according to, for example, a short-range radio standard, such as Bluetooth®. For example, wearable communication device 30 includes a microphone via which it receives voice input provided by the user. Communication apparatus 30 converts the voice received via the microphone into a voice signal and transmits the voice signal to communication device 10A.

Communication device 10A connects with a network 90 via broadband router 91. A communication device 10B connects with network 90 via a radio base station 92. Communication device 10A and communication device 10B communicate with a server 20 over network 90. Communication device 10B is capable of transmitting commands over network 90 for controlling operations of information appliance 40. Hereinafter, communication device 10A and communication device 10B may be collectively referred to as "communication device 10."

Server 20 receives the voice signal from, for example, communication device 10A, and performs a speech recognition process. Server 20 determines, by the speech recognition process, intent of the user who has provided the voice input, and responds to, for example, communication device 10A with a result of the speech recognition process.

Communication device 10A and communication device 10B are, but not limited to, smart phones, for example. Communication device 10A and communication device 10B support multiple wireless communication standards, such as 3G, long term evolution (LTE), high speed wireless local area network (LAN) standard, and Bluetooth®. As shown in FIG. 1, the user of communication device 10A is staying at house. Various information appliances 40 (e.g., television 40A and air conditioner40B) are installed in the house. Information appliance 40 has communication capabilities and is communicable with server 20 over network 90 by communicating with broadband router 91. Operating statuses of home appliances included in information appliance 40 are transmitted to server 20 one after another. Server 20 receives the operating statuses of the respective home appliances included in information appliance 40 over network 90, and accumulates the operating status information.

<Configuration>

Figure 2:
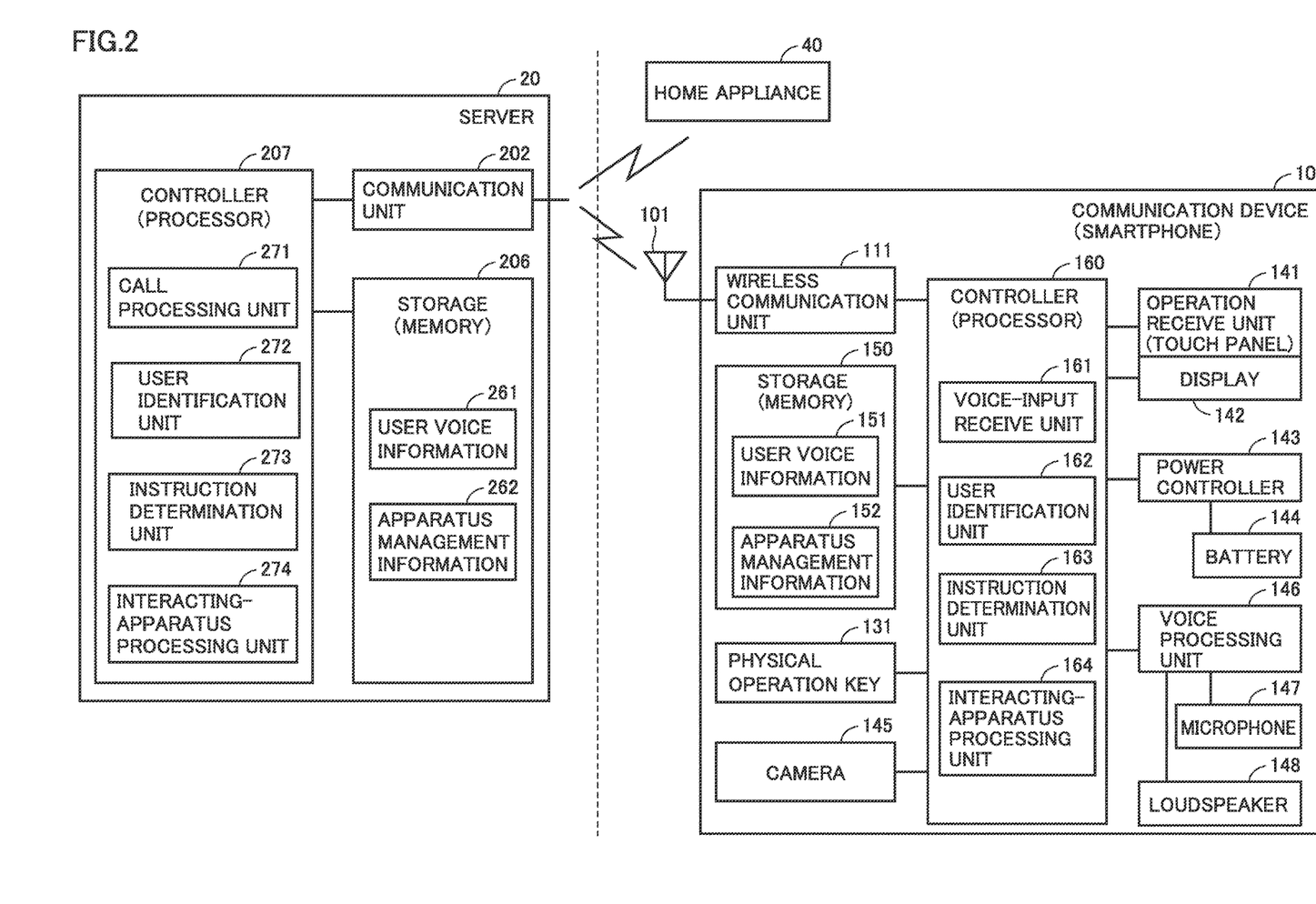
FIG. 2 is a block diagram of a communication device 10 configuration and a server 20 configuration.

Referring to FIG. 2, respective devices according to the present embodiment are described in detail.

FIG. 2 is a block diagram of a communication device 10 configuration and a server 20 configuration. Communication device 10 and wearable communication device 30 are communicable with each other.

As shown in FIG. 2, communication device 10 includes an antenna 101, a wireless communication unit 111, a physical operation key 131, an operation receive unit (touch panel) 141, a display 142, a power controller 143, a camera 145, a voice processing unit 146, a microphone 147, a loudspeaker 148, a storage 150, and a controller 160.

Antenna 101 radiates a signal emitted by communication device 10, as a radio wave. Antenna 101 also receives a radio wave through the air and provides the received signal to wireless communication unit 111. In the present embodiment, communication device 10 supports the multiple wireless communication standards.

Wireless communication unit 111 modulates and demodulates signals for transmission and reception via antenna 101 or the like so that communication device 10 communicates with another wireless device. Wireless communication unit 111 is a communications module which includes a tuner, a received signal strength indicator (RSSI) computation circuit, a cyclic redundancy check (CRC) computation circuit, a radio-frequency circuit, etc. Wireless communication unit 111 modulates, demodulates, or frequency converts a radio signal for transmission and reception by communication device 10, and provides a received signal to controller 160.

Physical operation key 131 is a physical input device which receives a pressing operation made by the user. In response to the pressing operation by the user, physical operation key 131 outputs to controller 160 a signal indicative of the operation Operation receive unit 141 receives an input operation from the user. Operation receive unit 141 detects a position of a user's touch, using a capacitive touch panel, for example. Operation receive unit 141 outputs to controller 160 a signal indicative of the detected position of user's touch as an input operation.

Display 142 displays data, such as an image, a video, text, etc., according to control by controller 160. Display 142 is implemented, using a liquid crystal display (LCD) or an organic electro-luminescent (EL) display, for example.

Power controller 143 controls supply of power to respective circuits included in communication device 10. Power controller 143 is, for example, an integrated circuit (IC) for power control. A battery 144 is a source of supply of power for operating the respective circuits included in communication device 10. Power charged in battery 144 is supplied to the respective circuits, according to control by power controller 143.

Voice processing unit 146 modulates and demodulates the voice signal. Voice processing unit 146 modulates the signal provided via microphone 147 and provides the modulated signal to controller 160, Voice processing unit 146 also provides the voice signal to loudspeaker 148. Voice processing unit 146 is implemented, using a processor for voice processing, for example. Microphone 147 receives the voice input and provides voice processing unit 146 with a voice signal corresponding to the voice input. Loudspeaker 148 converts the voice signal provided by voice processing unit 146 into an audio, and outputs the audio out of communication device 10.

Storage 150 is configured of, for example, a flash memory or the like, and stores data and programs used by communication device 10. In a certain aspect, storage 150 stores user voice information 151 and apparatus management information 152. If there are multiple users, storage 150 manages and stores information for each of the multiple users, the information being information on information appliance 40 to which communication device 10 can transmit commands and a command that can be transmitted to information appliance 40.

User voice information 151 is sample user voice data that is stored in storage 150 for identification of the user by his/her voice. For example, communication device 10 takes a sample of user voice during every call conversation of the user, and stores the user voice as user voice information 151.

Apparatus management information 152 is information for managing information appliance 40 with which communication device 10 communicates. Examples of the information for managing information appliance 40 include an address (such as a media access control (MAC) address) of information appliance 40 for communication device 10 to communicate with information appliance 40. For example, communication device 10 sends a beacon signal and stores as apparatus management information 152 into storage 150 a list of information appliances 40 that are in communication with communication device 10.

Controller 160 loads a program stored in storage 150 and executes a command included in the program, thereby controlling operation of communication device 10. Controller 160 is an application processor, for example. Controller 160 operates in accordance with the program, thereby providing functions as a voice-input receive unit 161, a user identification unit 162, an instruction determination unit 163, and an interacting-apparatus processing unit 164.

Voice-input receive unit 161 receives the voice input provided by the user via microphone 147 and generates the voice signal.

User identification unit 162 performs processing to authenticate the user, based on the voice signal generated by voice-input receive unit 161 and user voice information 151 accumulated in storage 150 for user identification. If there are multiple users, user identification unit 162 authenticates a user who has input the voice to communication device 10, among the users.

Instruction determination unit 163 performs the speech recognition process on the voice signal generated by voice-input receive unit 161, thereby determining an instruction of the user indicated by the user's voice.

If user identification unit 162 authenticates the user and instruction determination unit 163 determines the instruction of the user, interacting-apparatus processing unit 164 transmits a command according to the instruction to information appliance 40 that is associated with the determined instruction of the user. If instruction determination unit 163 determines the instruction of the user to be directed at one or more information appliances 40 that are communicable with communication device 10, interacting-apparatus processing unit 164 transmits the command to a target information appliance 40 among the one or more information appliances 40. If there are multiple information appliances 40 that are associated with the instruction of the user, interacting-apparatus processing unit 164 receives from the user a selection operation for determining information appliance 40 to which the command is to be transmitted, and sets priority to the information appliances, based on the selection, and informs the user of an information appliance that is a selection candidate based on the priority. Failure of at least one of the user authentication by user identification unit 162 or the determination of the instruction of the user by instruction determination unit 163, in which case interacting-apparatus processing unit 164 does not, transmit, the command to information appliance 40. Interacting-apparatus processing unit 164 transmits the command to information appliance 40, according to the management of information for the user authenticated by user identification unit 162, the information being information on information appliance 40 to which communication device 10 can transmit commands and a command that can be transmitted to information appliance 40.

Referring to FIG. 2, server 20 includes a communication unit 202, a storage 206, and a controller 207. Storage 206 is configured of a flash memory, hard disk drive (HDD), or random access memory (RAM), etc. Storage 206 stores programs used by server 20 and accumulates various data items used by server 20. Communication unit 202 is a communications interface which modulates and demodulates signals so that server 20 communicates with another communication device.

In a certain aspect, storage 206 stores user voice information 261 and apparatus management information 262. User voice information 261 is sample voice data of the user for identifying the user by his/her voice. Communication device 10 performs a user authentication process by comparing voice input via microphone 147 or the like with the user's sample voice pre-stored in a memory. Moreover, server 20 may receive voice that is input to communication device 10 via microphone 147 or the like, and compare the received voice with user voice information 261.

Apparatus management information 262 is information for managing information appliance 40 with which communication device 10 communicates. Examples of apparatus management information 262 include an address of information appliance 40 installed in the facility, information on power consumption by information appliance 40, and other information.

Controller 207 loads and executes a program stored in storage 206, thereby controlling operation of server 20. Controller 207 is implemented, using multiple processors, for example. Controller 207 operates in accordance with the program, thereby functioning as a call processing unit 271, a user identification unit 272, an instruction determination unit 273, and an interacting-apparatus processing unit 274.

During a call process between communication device 10A and communication device 10B using, for example, call applications, call processing unit 271 establishes communicative connection therebetween, and transmits and receives voice data for these communication devices.

User identification unit 272 receives the voice signal generated by voice-input receive unit 161 included in communication device 10, and performs processing to authenticate the user, based on the received voice signal and user voice information 261 accumulated in storage 206 for user identification. If there are multiple users, user identification unit 272 authenticates a user who has input the voice to communication device 10, among the multiple users.

Instruction determination unit 273 performs the speech recognition process on the voice signal generated by voice-input receive unit 161 included in communication device 10, thereby determining the instruction of the user indicated by his/her voice.

If user identification unit 162 authenticates the user and instruction determination unit 163 determines the instruction of the user, interacting-apparatus processing unit 274 transmits a command according to the instruction to information appliance 40 associated with the determined instruction of the user.

Alternatively to communication device 10, server 20 may perform as such, that is, server 20 may perform: the processing to authenticate the user who has provided the voice input to communication device 10, based on the sample data of the user voice; the processing to determine the instruction of the user by the speech recognition process on the voice signal; and the processing to transmit a command to information appliance 40 associated with the determined instruction of the user.

Figure 3:
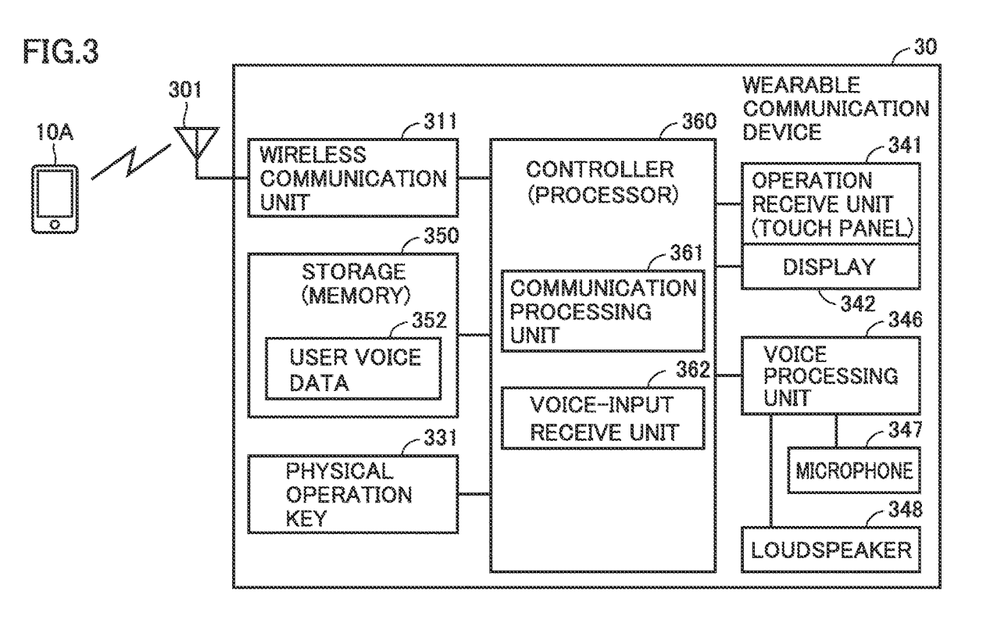
FIG. 3 is a diagram schematically showing a configuration of a wearable communication device 30.

FIG. 3 is a diagram schematically showing a configuration of wearable communication device 30. Wearable communication device 30 is a wearable device and is implemented in various forms, such as a wrist watch device, an eyewear device, or a wristband device, for example. Wearable communication device 30 is connected to communication device 10, according to a short-range wireless communication standard such as Bluetooth®, for example, and performs various processing in interaction with communication device 10. For example, wearable communication device 30 receives various notifications (such as a new message in a messaging application) from communication device 10, and, for example, audibly informs the user of the notifications.

As shown in FIG. 3, wearable communication device 30 includes an antenna 301, a wireless communication unit 311, a physical operation key 331, an operation receive unit (touch panel) 341, a display 342, a voice processing unit 346, a microphone 347, a loudspeaker 348, a storage 350, and a controller 360.

Antenna 301 radiates a signal emitted by wearable communication device 30, as a radio wave. Antenna 301 also receives a radio wave through the air and provides the received signal to wireless communication unit 311. In the present embodiment, wearable communication device 30 supports multiple wireless communication standards.

Wireless communication unit 311 modulates and demodulates signals for transmission and reception via antenna 301 or the like. Wireless communication unit 311 is a communications module which includes a tuner, an RSSI computation circuit, a CRC computation circuit, a radio-frequency circuit, etc. Wireless communication unit 311 modulates, demodulates, or frequency converts a radio signal for transmission and reception by wearable communication device 30, and provides a received signal to controller 360.

Physical operation key 331 is a physical input device which receives a pressing operation made by the user. In response to the pressing operation by the user, physical operation key 331 outputs to controller 360 a signal indicative of the operation. For example, if wearable communication device 30 is a wrist watch wearable device, physical operation key 331 is a stem of the watch, for example.

Operation receive unit 341 receives an input operation from the user. Operation receive unit 341 detects a position of a user's touch, using a capacitive touch panel, for example. Operation receive unit 341 outputs to controller 360 a signal indicative of the detected position of user's touch, as an input operation.

Display 342 displays an image, a video, text, and other information according to control by controller 360. Display 342 is implemented, using an LCD or an organic EL display, for example.

Voice processing unit 346 modulates and demodulates the voice signal. Voice processing unit 346 modulates a signal provided via microphone 347, and provides the modulated signal to controller 360. Voice processing unit 346 also provides the voice signal to loudspeaker 348. Voice processing unit 346 is implemented, using a processor for voice processing, for example.

Microphone 347 receives the voice input and provides voice processing unit 346 with a voice signal corresponding to the voice input. Loudspeaker 348 converts the voice signal provided by voice processing unit 346 into an audio, and outputs the audio out of the wearable communication device 30.

Storage 350 is configured of, for example, a flash memory or the like, and stores data and programs used by wearable communication device 30. In a certain aspect, storage 350 stores user voice data 352. User voice data 352 indicates the voice signal that is generated by wearable communication device 30 digitally converting the voice input received via microphone 347.

Controller 360 loads a program stored in storage 350 and executes a command included in the program, thereby controlling operation of wearable communication device 30. Controller 360 is an application processor, for example. Controller 360 operates in accordance with the program, thereby providing functions as a communication processing unit 361 and a voice-input receive unit 362.

Communication processing unit 361 performs processing to establish communicative connection of wearable communication device 30 with an external device, such as communication device 10, and transmit and receive data to and from the external device. For example, wearable communication device 30 communicatively connects with communication device 10, according to Bluetooth® or a wireless LAN standard, etc.

Voice-input receive unit 362 receives voice input to wearable communication device 30 via microphone 347, and digitally converts the received voice to generate a voice signal.

<Operation>

Figure 4:
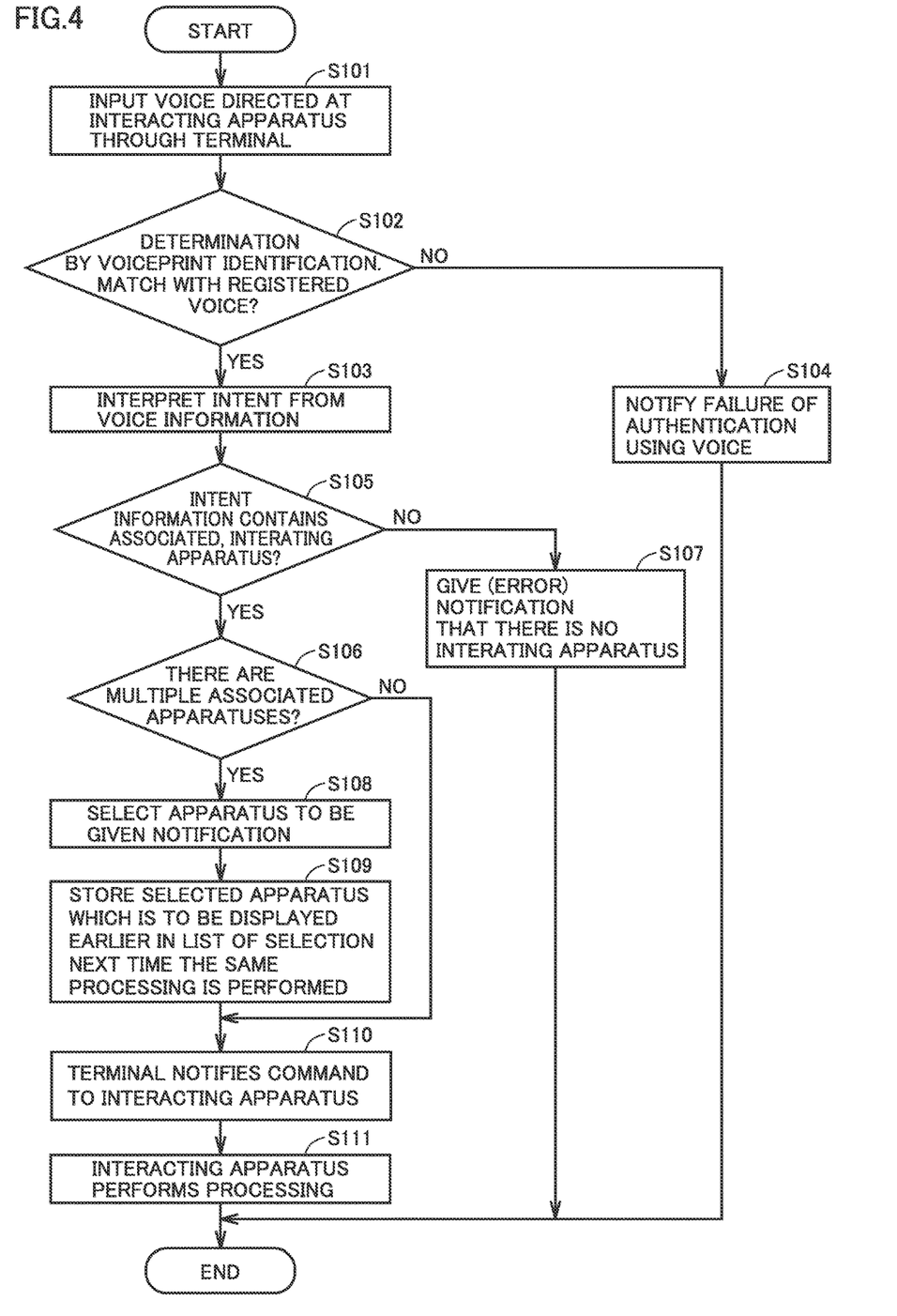
FIG. 4 is a flowchart illustrating a process, by communication device 10, of receiving voice input from a user and authenticating the user based on the received voice, and a process of determining an instruction of the user and transmitting a command to an information appliance 40 according to a processing result.

Referring to FIG. 4, operation of communication device 10 included in the information appliance system according to the present embodiment is described.

FIG. 4 is a flowchart illustrating a process, by communication device 10, of receiving the voice input provided by a user and authenticating the user based on the received voice, and a process of determining an instruction of the user and transmitting a command to an information appliance 40 according to a processing result.

In step S101, communication device 10 receives voice input provided by the user via microphone 147. The user inputs voice containing a command directed at information appliance 40 via microphone 147.

In step S102, communication device 10 performs a voiceprint identification process by comparing a voice signal obtained from the voice input in step S101 with user voice information 151 which is accumulation of user voices taken as sample data during the call process, for example. By doing so, communication device 10 authenticates the user. If communication device 10 authenticates the user by the voiceprint identification process (YES in step S102), communication device 10 performs the process of step S103. If communication device 10 fails to authenticate the user as a result of the voiceprint identification process (NO in step S102), communication device 10 performs the process of step S104.

In step S103, communication device 10 performs the speech recognition process on the voice signal obtained by the voice input in step S101, thereby interpreting user's intent containing a command from the user directed at information appliance 40.

In step S104, communication device 10 notifies the user of the failure of the user authentication using the user's voice, by indication on display 142 and/or by audible output from loudspeaker 148.

In step S105, communication device 10 determines whether a result of the interpretation of user's intent by the process of step S103 can be processed by information appliance 40 that is in interaction with communication device 10 by communications processing. For example, communication device 10 extracts information identifying information appliance 40 (e.g., an appliance "air conditioner," or an appliance "television," etc. in the voice signal of the user) from the result of the interpretation of user's intent by the process of step S103. Communication device 10 refers to apparatus management information 152 to determine whether information appliance 40 designated by the user is communicable with communication device 10. Communication device 10 also determines, from the result of the interpretation of user's intent by the process of step S103, whether a command from the user to information appliance 40 designated by the user is executable on that information appliance 40. For example, if the command is designated to the appliance "air conditioner" to change the temperature setting, communication device 10 determines that the appliance "air conditioner" can execute the command. As such, from the result of interpretation of user's intent, communication device 10 determines: the appliance designated by the user; whether the appliance designated by the user and communication device 10 are in interaction with each other by communications processing; and whether the appliance designated by the user can execute the command of the user. For example, identification information of appliances that are in interaction with communication device 10 by communications and commands that can be transmitted to these appliances are associated in apparatus management information 152. If the result of the interpretation of user's intent by the process of step S103 indicates that the user's intent can be processed by information appliance 40 in interaction with communication device 10 by communications processing (YES in step S105), communication device 10 performs the process of step S106, and otherwise (NO in step S105) performs the process of step S107.

In step S106, communication device 10 determines, from the result of interpretation of user's intent by the process in step S103, whether there are multiple information appliances 40 that are designated by the user. Communication device 10 extracts information identifying information appliance 40 from the result of the interpretation of user's intent, and determines whether the interpretation of user's intent contains commands directed at multiple appliances, based on the extraction. For example, if the voice signal of the user includes information identifying multiple appliances such as the appliance "air conditioner" and the appliance "television," communication device 10 determines that multiple information appliances 40 are designated by the user. If communication device 10 determines, from the result of the interpretation of user's intent, that the interpretation of user's intent contains commands directed at multiple appliances (YES in step S106), communication device 10 performs the process of step S108, and otherwise (NO in step S106) performs the process of step S110.

In step S107, communication device 10 gives the user an error notification indicating that there is no information appliance 40 to which a command given by the user voice is to be transmitted, the error notification being given by indication on display 142 and/or by audible output from loudspeaker 148.

In step S108, communication device 10 displays candidate apparatuses for selection on display 142 to allow the user to select and designate an apparatus to which the user command is to be transmitted among the multiple information appliances 40. Alternatively, communication device 10 audibly outputs candidate apparatuses for selection from loudspeaker 148 and receives selection of an apparatus by receiving a designation of the apparatus from the user through voice input.

In step S109, communication device 10 stores the apparatus whose selection is received from the user in step S108. Communication device 10 stores information on the apparatus selected by the user, as a history. Next time the user gives commands directed at multiple apparatuses, communication device 10 preferentially notifies the user of candidate apparatuses for selection, according to histories of the apparatuses selected by the user, the candidate apparatuses being apparatuses that have been selected more often by the user. For example, when multiple information appliances 40 are designated by the user, communication device 10 preferentially displays on display 142 the apparatuses which have been selected more often by the user, based on the history of the number of selections of the apparatuses by the user.

In step S110, communication device 10 notifies a command according to the user's intent interpreted in step S103 to information appliance 40 that is associated with the user command (information appliance 40 selected by the user, if the result of interpretation of user's intent indicates that multiple information appliances 40 are designated by the user). For example, communication device 10 transmits a command, such as "power-off," to the appliance "air conditioner," based on a result of the speech recognition process performed on the voice input provided by the user.

In step S111, information appliance 40, having received the user command from communication device 10, performs processing according to the command received from communication device 10.

<Summary>

Conventionally, there are communication devices which perform a speech recognition process on the input user's voice to provide an operational instruction to an information appliance. However, from the standpoint of security, giving an operational instruction to the information appliance by the speech recognition process without user authentication can permit operation of the information appliance by third-parties. Thus, to provide security measures, it is necessary that a user additionally inputs, through voice input, information identifying the user, and a voice signal based on the input voice is transmitted to a speech recognition server, etc. From the standpoint of security, additional measures are needed particularly for the voice input of information desired to be concealed (e.g., ID information) in the user authentication and for the transmission of the information desired to he concealed to the speech recognition server, etc.

On the other hand, according to the present embodiment, communication device 10 is employed which achieves improved accuracy in recognition of user voice by storing and accumulating user voices as sample data during, for example, the call process, etc. Communication device 10 compares a voice input thereto with sample voice data of the user accumulated as such in communication device 10 for authentication of the user. Thus, the user is readily authenticated.

Further, communication device 10 performs the speech recognition process on a voice signal based on the voice input by the user to communication device 10, thereby allowing a result of the speech recognition process on the user voice to be shared by Machine to Machine (M2M) technology among information appliances 40 that are in interaction with communication device 10.

Communication device 10 is capable of interpreting user's intent by the speech recognition process and, according to a result of the interpretation, giving appropriate information appliance 40 an instruction based on a result of the speech recognition process. This enables highly secure speech recognition process and implementation of processing on an appropriate device. Further, if communication device 10 supports operations by multiple users, communication device 10 can give a command to information appliance 40 based on user authentication and the speech recognition process for each of the users. For example, information appliance 40 managed by communication device 10 is manageable for each user.

Such an information appliance system enables, for example, unlocking of communication device 10 by user authentication based on user voice, and also allows for various processes on information appliance 40. For example, the user can utilize the appliance system according to the present embodiment to use the voice input to communication device 10, as a trigger for activating features related to home security. The technology of the information appliance system according to the present embodiment can also be used as a security measure for a terminal that is capable of speech recognition. The user can also utilize the information appliance system to remotely control information appliance 40 through voice input provided thereto from communication device 10.

Note that, in the description of FIG. 4, communication device 10 performs the voiceprint identification process and the speech recognition process (step S102, step S103), based on a voice input via microphone 147 (step S101). Not limiting to the voice input via microphone 147, communication device 10 may receive voice input from a device, such as wearable communication device 30 communicatively connected to communication device 10, and receive a voice signal from wearable communication device 30 to perform the voiceprint identification process, etc.

Each of the devices included in the system according to the present embodiment is implemented using a processor and a program executed on the processor. A program implementing the present embodiment is provided by, for example, transmission and reception using a network via a communications interface.

Note that the above embodiment presently disclosed should be considered illustrative in all aspects and do not limit the present invention. The scope of the present invention is indicated by the appended claims, rather than by the above description, and all changes which come within the meaning and range of equivalency of the appended claims are intended to be included within the scope of the present invention.

REFERENCE SIGNS LIST

101 antenna; 111 wireless communication unit; 131 physical operation key; 141 operation receive unit; 142 display; 143 power controller; 145 camera; 146 voice processing unit; 147 microphone; 148 loudspeaker; 150 storage; 151 user voice information; 152 apparatus management information; 160 controller; 161 voice-input receive unit; 162 user identification unit; 163 instruction determination unit; 164 interacting-apparatus processing unit; 202 communication unit; 206 storage; 207 controller; 261 user voice information; 262 apparatus management information; 271 call processing unit; 272 user identification unit; 273 instruction determination unit; 274 interacting-apparatus processing unit; 301 antenna; 311 wireless communication unit; 341 operation receive unit; 342 display; 346 voice processing unit; 347 microphone; 348 loudspeaker; 350 storage; 352 user voice data; 360 controller; 361 communication processing unit; 362 voice-input receive unit; 10 communication device; 20 server; 30 wearable communication device; 40 information appliance; 90 network; 91 broadband router; 92 radio base station.

The invention claimed is:

1. A communication device configured communicable with one or more communication apparatuses, the communication device comprising:
   a processor for voice processing configured to receive input of a voice and output voice signal based on the input voice; and
   a controller configured to control an operation of the communication device, the controller is configured to:
      perform processing to authenticate a user, based on the voice signal, and voice data accumulated in a storage for user identification;
      perform a speech recognition process on the voice signal to determine an instruction of the user indicated by the received voice; and
      when the user is authenticated and the instruction of the user is determined, transmit a command according to the instruction to a communication apparatus among the one or more communication apparatuses that is associated with the determined instruction of the user,
   wherein when the instruction of the user is associated with a plurality of communication apparatuses among the one or more communication apparatuses, transmitting the command includes: receiving from the user a selection operation of selecting a communication apparatus to which a command is to be transmitted among the plurality of communication apparatuses; setting priority to the plurality of communication apparatuses based on the number of selections of the plurality of communication apparatuses by the user; and informing preferentially the user of apparatuses which have been selected more often by the user, among the plurality of communication apparatus, based on the set priority.

2. The communication device according to claim 1, wherein
   when the determined instruction of the user is directed at the one or more communication apparatuses communicable with the communication device, transmitting the command includes transmitting the command to the one or more communication apparatuses.

3. The communication device according to claim 1, wherein
   failure of at least one of: authenticating the user; or determining the instruction of the user, in which case, transmitting the command includes not transmitting the command to the communication apparatus.

4. The communication device according to claim 1, wherein
    processing to authenticate the user includes authenticating a user who has input the voice to the communication device, among multiple users,
    the communication device is configured to store information for each of the multiple users, the information being information on the communication apparatus to which a command can be transmitted and a command that can be transmitted to the communication apparatus, and
    transmitting the command includes transmitting the command to the communication apparatus, according to the information, for the authenticated user, on the communication apparatus to which the command can be transmitted and a command that can be transmitted to the communication apparatus.

5. A communication device communicable with a server device, the server device being configured to store voice data for user identification, the communication device being configured communicable with one or more communication apparatuses, and comprising:
    a processor for voice processing configured to receive input of a voice, and output a voice signal based on the input voice; and
    a controller configured to control an operation of the communication device, the controller is configured to:
        transmit the voice signal to the server device to cause the server device to perform processing to authenticate a user based on the voice signal and processing to determine an instruction of the user indicated by the voice signal, and
        receive a processing result from the server device, and
        when the user is authenticated and the instruction of the user is determined by the server device, transmit a command according to the instruction to a communication apparatus among the one or more communication apparatuses that is associated with the determined instruction of the user,
    wherein when the instruction of the user is associated with a plurality of communication apparatuses among the one or more communication apparatuses, transmitting the command includes: receiving from the user a selection operation of selecting a communication apparatus to which a command is to be transmitted among the plurality of communication apparatuses; setting priority to the plurality of communication apparatuses based on the number of selections of the plurality of communication apparatuses by the user; and informing preferentially the user of apparatuses which have been selected more often by the user, among the plurality of communication apparatuses, based on the set priority.

* * * * *